United States Patent [19]

Anton et al.

[11] Patent Number: 5,798,426

[45] Date of Patent: Aug. 25, 1998

[54] ACRYLIC POLYMER COMPOUNDS

[75] Inventors: Waifong Liew Anton; Harry Joseph Spinelli, both of Wilmington, Del.; Anjali Abhimanyu Patil, Westfield, N.J.

[73] Assignee: E. I. du Pont de Nemours and Company, Wilmington, Del.

[21] Appl. No.: 915,542

[22] Filed: Aug. 13, 1997

Related U.S. Application Data

[63] Continuation of Ser. No. 644,149, May 10, 1996, abandoned.

[51] Int. Cl.$^6$ ................................................. C08F 20/10
[52] U.S. Cl. ........................ 526/318.41; 526/281; 526/279
[58] Field of Search ................................... 526/318.41

[56] References Cited

U.S. PATENT DOCUMENTS

| | | | |
|---|---|---|---|
| 3,554,987 | 1/1971 | Smith et al. | 260/79.3 |
| 3,721,555 | 3/1973 | Becker et al. | 96/29 D |
| 4,158,053 | 6/1979 | Greene et al. | 424/61 |
| 4,906,684 | 3/1990 | Say | 524/548 |
| 4,954,559 | 9/1990 | Den Hartog et al. | 524/507 |
| 5,166,254 | 11/1992 | Nickle et al. | 524/549 |
| 5,266,322 | 11/1993 | Myers et al. | 242/401 |
| 5,334,683 | 8/1994 | Kawanaka et al. | 526/318.41 |
| 5,380,520 | 1/1995 | Dobbs | 242/61 |

FOREIGN PATENT DOCUMENTS

| | | | |
|---|---|---|---|
| 9189709 | 8/1994 | Australia . | |
| 0214760 | 3/1987 | European Pat. Off. | 526/318.41 |
| 0626391A1 | 5/1994 | European Pat. Off. | C08F 220/12 |
| 0697417A | 8/1995 | European Pat. Off. | C08F 8/30 |
| 60-122770 | 7/1985 | Japan | 526/318.41 |
| 2-218243 | 8/1990 | Japan | A61K 7/043 |
| 1994-279239 | 10/1994 | Japan . | |
| 8-40833 | 2/1996 | Japan | A61K 7/043 |

Primary Examiner—Joseph L. Schofer
Assistant Examiner—N. Sarofim
Attorney, Agent, or Firm—Hilmar L. Fricke

[57] ABSTRACT

An acrylic polymer of polymerized monomers of about 55–80% by weight of an alkyl methacrylate having 1–12 carbon atoms in the alkyl group, and alkyl acrylate having 1–12 carbon atoms in the alkyl group, substituted or unsubstituted aryl methacrylate or acrylate, substituted or unsubstituted alicyclic methacrylate or acrylate, substituted or unsubstituted cyclic methacrylate or acrylate, a polymerizable vinyl aromatic monomer, vinyl pyrrolidone or any mixtures of the above monomers, and contains about 5–40% by weight of acetoacetoxy ethyl methacrylate and about 5–15% by weight of ethylenically unsaturated acid and the acrylic polymer has a weight average molecular weight of about 10,000–3,000,000 and a glass transition temperature of about −20° to 50° C.

11 Claims, No Drawings

5,798,426

ACRYLIC POLYMER COMPOUNDS

This is a continuation of application Ser. No. 08/644,149 filed May 10, 1996, now abandoned.

BACKGROUND OF THE INVENTION

This invention is directed to an acrylic polymer that is useful in formulating coatings and adhesives.

There is a need for an acrylic polymer containing adhesion promoting groups for use in adhesives and coating compositions since initial adhesion and loss of adhesion on exposure to water are common problems that are difficult to solve. Ambient temperature curing compositions containing AAEMA (acetoacetoxy ethyl methacrylate), glycidyl methacrylate or acrylate and a polymerizable acid are shown in Say U.S. Pat. No. 4,906,684 issued Mar. 6, 1990. Cosmetic film forming compositions of an aqueous emulsion of sulfopolyesters and a copolymer of vinyl acetate and dialkyl maleate or fumerate and an emulsion polymer of acetoacetoxy ethyl alkyl acrylate are shown in Meyers et al U.S. Pat. No. 5,266,322 issued Nov. 30, 1993 and Dobbs U.S. Pat. No. 5,380,520 issued Jan. 10, 1995. European Patent Application 0 626 397 A1 published Nov. 30, 1994 shows a thermoplastic tile adhesive of an emulsion polymer of an all acrylic polymer or an acrylic-styrene polymer containing AAEMA. None of these polymers provide the adhesion, resistance to delamination by water, durability, scratch resistance and gloss retention that are required for polymers used in certain coatings and adhesives.

SUMMARY OF THE INVENTION

An acrylic polymer composed of polymerized monomers of about 55–80% by weight of any one of the following monomers or mixtures thereof: an alkyl methacrylate having 1–12 carbon atoms in the alkyl group, and alkyl acrylate having 1–12 carbon atoms in the alkyl group, substituted or unsubstituted aryl methacrylate or acrylate, substituted or unsubstituted alicyclic methacrylate or acrylate, substituted or unsubstituted cyclic methacrylate or acrylate, a polymerizable vinyl aromatic monomer or vinyl pyrrolidone, and contains 5–40% by weight of acetoacetoxy ethyl methacrylate and 5–15% by weight of an ethylenically unsaturated acid and the acrylic polymer has a weight average molecular weight of about 10,000–3,000,000 and a glass transition temperature of about −20° to 50° C.

DETAILED DESCRIPTION

The acrylic polymer of this invention has excellent adhesion to various substrates such as glass, ceramics, metals and to keratin of a nail and can be used in adhesives and coatings. The unique combination of the acetoacetoxy ethyl methacrylate and carboxylic acid in the acrylic polymer provides a combination of adhesion promoting groups that are new to the art for coatings and adhesives. The acrylic polymer has a glass transition temperature in the range of about −20° to 50° C. The acrylic polymer can be used to form a clear coating composition or a pigmented coating composition that has excellent durability, hardness, good adhesion to various substrates, scratch and mar resistance, resistance to water and has excellent gloss retention. Adhesives formulated from the polymer have outstanding adhesion to many substrates and forms a strong water resistant bond.

The acrylic polymer can be prepared by conventional solution polymerization processes in which the monomers, solvent and polymerization initiator are charged over a 1–24 hour period of time, preferably 2–8 hours, into a conventional polymerization reactor in which the constituents are heated to about 60°–175° C., preferably 80°–100° C. The polymer formed is a linear random polymer that has a weight average molecular weight of about 10,000–200,000.

Molecular weight is determined by gel permeation chromatography using polymethyl methacrylate as the standard.

Glass transition temperature of the polymer is calculated according to the following formula:

$$\frac{1}{T_g} = \frac{W_1}{T_{g1}} + \frac{W_2}{T_{g2}} + \frac{W_3}{T_{g3}} + \ldots + \frac{W_n}{T_{gn}}$$

where Tg is the glass transition temperature of the polymer in degrees Kelvin; $W_1$, $W_2$, $W_3$ . . . $W_n$ are the weight fractions of each of the components of the polymer and $T_{g1}$, $T_{g2}$, $T_{g3}$, $T_{gn}$ are the Tg, in degrees Kelvin, of the homopolymer made from the individual components of the polymer. [Reference: T. G. Fox, Bull. Am. Phys. Soc., 1, No. 3, p 123 (1956)]

Typical polymerization initiators that are used in the process are as follows: azo type initiators such as azo-bis-isobutyronitrile, 1,1'-azo-bis(cyanocyclohexane), peroxy acetates such as t-butyl peracetate; peroxides such as di-t-butyl peroxide, benzoates such as t-butyl perbenzoates, octoates such as t-butyl peroctoate and the like.

Typical solvents that can be used are ketones such as methyl amyl ketone, methyl isobutyl ketone, methyl ethyl ketone, aromatic hydrocarbons such as toluene and xylene, alcohols such as propanol, methoxy propanol and butanol, alkylene carbonates such as propylene carbonate, n-methyl pyrrolidone, ethers, esters, acetate and mixtures of any of the above.

The acrylic polymer an be formulated into a solvent based composition which preferably contains about 5–80% by weight of the acrylic polymer and 20–95% by weight of organic solvent for the acrylic polymer.

An aqueous composition can be formed from the acrylic polymer prepared by solution polymerization by stripping off the solvent and adding ammonia or amine and water preferably, with some organic solvent to form an aqueous dispersion, hydrosol or solution.

An alternative method of forming an aqueous composition is to disperse the polymer into water or water/solvent mixtures with the aid of surfactants.

Higher molecular weight acrylic polymers can be formed by conventional emulsion polymerization techniques by emulsifying a mixture of monomer, water, surfactant and polymerization catalyst and charging the resulting emulsion into a conventional polymerization reactor and heating the constituents in the reactor to about 60°–95° C. for about 15 minutes to about 8 hours. The resulting latex typically has a polymer solids content of about 10–40% of polymer dispersed in an aqueous medium and the polymer has a weight average molecular weight of about 200,000–3,000,000.

Typical catalysts used in the emulsion polymerization process are ammonium persulfate, hydrogen peroxide, sodium meta bisulfite, hydrogen peroxide, sodium sulfoxylate and the like.

Typical useful surfactants that are used in the emulsion polymerization process are nonylphenoxypolyethyleneoxy ethanol sulfate, allyl dodecyl sulfosuccinate, alkyl phenoxy polyethylene oxyethanol, sodium lauryl sulfate and mixtures thereof.

By using chain transfer agents, lower molecular weight aqueous polymer dispersions can be formed in which the polymer has a weight average molecular weight of about 20,000–100,000.

Typical chain transfer agents that can be used are mercaptans such as dodecyl thiols, butane thiols and the like.

The acrylic polymer in an aqueous carrier may be neutralized with ammonia, typically, ammonium hydroxide, an alkali metal hydroxide such as sodium hydroxide or potassium hydroxide or an amine and the pH is adjusted to about 7–10. Useful amines are alkyl amines such as ethylamine, diethylamine, methylethylamine propylamine; amino methyl propanol, tertiary amines such as trimethylamine, triethylamine, dimethylaniline, diethylaniline, triphenylamine, dimethylethanol amine, triethanol amine, and the like.

An aqueous composition of the acrylic polymer preferably contains about 5–60% by weight of the acrylic polymer and 40–95% by weight of an aqueous carrier for the acrylic polymer.

The acrylic polymer contains the combination of 5–40% by weight of polymerized acetoacetoxy ethyl methacrylate and 5–15% by weight of polymerized ethylenically unsaturated acid to provide the necessary adhesion promoting groups to the polymer. Typical ethylenically unsaturated acids are acrylic acid, methacrylic acid, itaconic acid and maleic acid. Preferred are acrylic acid and methacrylic acid. The remaining 55–80% by weight of the polymer can be other ethylenically polymerizable monomers which will provide a polymer with −20° to 50° C. glass transition temperature. These monomers are alkyl methacrylates having 1–12 carbon atoms in the alkyl group such as methyl methacrylate, ethyl methacrylate, butyl methacrylate, propyl methacrylate, isobutyl methacrylate, hexyl methacrylate, 2-ethyl hexyl methacrylate, nonyl methacrylate, lauryl methacrylate and the like; alkyl acrylates having 1–12 carbon atoms in the alkyl group such as methyl acrylate, ethyl acrylate, propyl acrylate, butyl acrylate, hexyl acrylate, 2-ethyl hexyl acrylate, nonyl acrylate, lauryl acrylate and the like; isobornyl methacrylate, isobornyl acrylate, benzyl methacrylate, benzyl acrylate, cyclohexyl methacrylate, cyclohexyl acrylate, alkylene oxide methacrylates and acrylates such as ethoxy triethylene glycol methacrylate and ethoxy triethylene glycol acrylate, acrylamide and methacrylamide, polymerizable vinyl aromatic monomers such as styrene, alpha methyl styrene, vinyl toluene and the like; vinyl pyrrolidone and mixtures of any of the above monomers.

Preferred monomers are butyl methacrylate, styrene, isobornyl methacrylate, a mixture of butyl methacrylate and butyl acrylate, a mixture of methyl methacrylate and butyl methacrylate, a mixture of methyl methacrylate, butyl acrylate and butyl methacrylate.

Typically useful acrylic polymer compositions are as follows:

an acrylic polymer of polymerized monomers of butyl methacrylate, acetoacetoxy ethyl methacrylate and acrylic acid; preferably, about 70–80% by weight of butyl methacrylate, 10–20% by weight of acetoacetoxy ethyl methacrylate and 10% by weight of acrylic acid and has a glass transition temperature of about 15° C.;

an acrylic polymer of butyl acrylate, butyl methacrylate, acetoacetoxy ethyl methacrylate and acrylic acid; preferably about 5% by weight of butyl acrylate, 65% by weight of butyl methacrylate, 20% by weight of acetoacetoxy ethyl methacrylate and 10% by weight of acrylic acid and has a glass transition temperature of about 10° C.;

an acrylic polymer of methyl methacrylate, butyl methacrylate, acetoacetoxy ethyl methacrylate and acrylic acid; preferably, about 10–40% by weight of methyl methacrylate, 30–60% by weight of butyl methacrylate, 20% by weight of acetoacetoxy ethyl methacrylate and 10% by weight of acrylic acid and has a glass transition temperature of about 21°–43° C.;

an acrylic polymer of methyl methacrylate, butyl acrylate, butyl methacrylate, acetoacetoxy ethyl methacrylate and acrylic acid; preferably, about 10% by weight of methyl methacrylate, 5% butyl acrylate, 55% by weight of butyl methacrylate, 20% by weight of acetoacetoxy ethyl methacrylate and 10% by weight of acrylic acid and has a glass transition temperature of about 16° C.;

an acrylic polymer of ethylhexyl methacrylate, styrene, isobutyl methacrylate, acetoacetoxy ethyl methacrylate and acrylic acid; preferably about 35% by weight of ethylhexyl methacrylate, 30% by weight styrene, 5% by weight isobutyl methacrylate, 20% by weight acetoacetoxy ethyl methacrylate, and 10% by weight acrylic acid and having a weight average molecular weight of about 50,000 and a glass transition temperature of about 25° C.;

an acrylic polymer of tris(trimethyl siloxy) silyl propyl methacrylate, isobornyl methacrylate, acetoacetoxy ethyl methacrylate and acrylic acid, preferably about 35% by weight of tris(trimethyl siloxy) silyl propyl methacrylate, 35% by weight of isobornyl methacrylate, 20% by weight acetoacetoxy ethyl methacrylate and 10% by weight acrylic acid and having a weight average molecular weight of about 50,000 and a glass transition temperature of about 25° C.;

an acrylic polymer of styrene, acetoacetoxy ethyl methacrylate and acrylic acid, preferably, about 70% by weight styrene, 20% by weight acetoacetoxy ethyl methacrylate and having a weight average molecular weight of about 10,000.

Typical compositions formulated with the acrylic polymer contain about 50–95% by weight, based on the weight of the film forming binder in the composition of the acrylic polymer and 5–50% by weight, based on the weight of the film forming binder in the composition of a crosslinking agent.

Typical crosslinking agents that can be used are polyepoxy resins, melamines, polyfunctional acrylates, polyfunctional methacrylates, polyfunctional amines.

Typical melamines include conventional aliphatic, cycloaliphatic difunctional and trifunctional melamines and melamine-formaldehyde resins. Examples are "Cymel" 303 (American Cyanamid), hexamethoxymethyl melamine.

Examples of useful polyfunctional acrylate include trimethylolpropane triacrylate and 1,6-hexanediol diacrylate. Examples of useful polyfunctional methacrylate include tetraethyleneglycol dimethacrylate and ethylene glycol dimethacrylate.

Polyepoxy resins that are useful are those that are conventionally used in coating compositions.

Typical polyfunctional amines that can be used are primary and secondary aliphatic and cycloaliphatic and aromatic diamines.

Solvent based compositions can contain organic polyisocyanate crosslinking agents such as aromatic, aliphatic, cycloaliphatic diisocyanates, trifunctional isocyanates and isocyanate functional adducts of polyols and diisocyanates. Organic polyisocyanates can be used in aqueous compositions when blocked with conventional blocking agents.

When the polymer is used in a coating composition, preferably the polymer has a glass transition temperature of 0° to 50° C. and when used in an adhesive, preferably the polymer has a glass transition temperature of about −20° to 25° C. If the glass transition temperature of the polymer is greater than that desired for the particular end use, plasticizers can be added to reduce the glass transition temperature for the composition. Typically useful plasticizers include phthalate esters such as di(2-ethylhexyl) phthalate, dioctyl phthalate; phosphate esters such as tricresyl phosphate such as tricresyl phosphate and other esters such as adipates, azelates, oleates, sebacates, fatty acid esters and glycol esters.

Appropriate types and levels of catalysts or inhibitors may be added to control the rate of crosslinking in these compositions.

These compositions can contain ultraviolet light stabilizers, screeners, quenchers and antioxidants typically used in compositions. Also, colorants and pigments can be added as well as flow control agents.

The following examples which illustrate the invention. One skilled in the art will readily recognize that these acrylic polymers can be readily formulated into high quality coating compositions or adhesives by the addition of a crosslinker as discussed above and form coatings for automobiles, trucks, appliances, furniture and the like, or adhesive compositions for metal, glass, plastic and the like. All parts and percentages are on a weight basis unless otherwise specified.

EXAMPLES

Example 1

A polymer solution of a polymer of n-butyl methacrylate (BMA), 2-(acetoacetoxy)ethyl methacrylate (AAEMA) and acrylic acid (AA) (weight ratio of 70/20/10) was prepared by charging the following constituents into a reactor equipped with a mechanical stirrer, thermometer and addition funnels:

Ethyl acetate, 117 g; n-butyl methacrylate, 35 g; 2-(acetoacetoxy)ethyl methacrylate; 10 g; and acrylic acid, 5 g; were charged into the reactor. The contents of the reactor were brought to its reflux temperature. A solution of 2,2'-azobis(2,4-dimethylvaleronitrile), 0.25 g in ethyl acetate, 5 g; was injected into the reactor. Feed 1 (n-butyl methacrylate, 140 g; 2-(acetoacetoxy)ethyl methacrylate, 40 g and acrylic acid, 20 g) was then started and added to the reactor over 60 minutes. Feed 2 (2,2'-azobis(2,4-dimethylvaleronitrile), 1.25 g in ethyl acetate, 25 g) was started at the same time as Feed 1 and added to the reactor over 90 minutes. Feed 3 (2,2'-azobis(2,4-dimethylvaleronitrile), 1.0 g in ethyl acetate, 20 g) was started at the end of Feed 2 and added to the reactor over the next 340 minutes. The mixture was held at its reflux temperature for another 30 minutes to form a polymer solution and then allowed to cool to room temperature.

The resultant polymer has a Tg (glass transition temperature) of about 15° C., a weight average molecular weight of 102,000 and number average molecular weight of 44,000 and polydispersity of 2.3.

The polymer solution was coated onto a clean glass plate to a 6 mil wet film thickness and dried to form a clear glossy film. The water and oil resistance of the dried film and the adhesion of the film were tested. The results of these tests are shown in Table I.

Example 2

A polymer solution of a polymer of n-butyl methacrylate (BMA), 2-(acetoacetoxy)ethyl methacrylate (AAEMA) and acrylic acid (AA) (weight ratio of 80/10/10) was prepared by charging the following constituents into a reactor equipped with a mechanical stirrer, thermometer and addition funnels:

Ethyl acetate, 129 g; was charged into the reactor and brought to its reflux temperature. Feed 1 (n-butyl methacrylate, 160 g; 2-(acetoacetoxy)ethyl methacrylate, 20 g; and acrylic acid, 20 g) was then started and added to the reactor over 180 minutes. Feed 2 (2,2'-azobis(2,4-dimethylvaleronitrile), 2.2 g in ethyl acetate, 44 g) was started at the same time as Feed 1 and added to the reactor over 300 minutes. The mixture was held at its reflux temperature for another 30 minutes to form a polymer solution and then allowed to cool to room temperature.

The resultant polymer had a Tg of about 21° C., weight average molecular weight of 78,000 and number average molecular weight of 36,000 and polydispersity of 2.2.

The polymer solution was coated onto a clean glass plate to a 6 mil wet film thickness and dried to form a clear glossy film. The water and oil resistance and adhesion are expected to be very similar to the polymer solution of Example 1.

Example 3

A polymer solution of a polymer of n-butyl acrylate (BA), n-butyl methacrylate (BMA), 2-(acetoacetoxy)ethyl methacrylate (AAEMA) and acrylic acid (AA) (weight ratio 5/65/20/10) was prepared by charging the following constituents into a reactor equipped with a mechanical stirrer, thermometer and addition funnels:

Ethyl acetate, 200 g; n-butyl acrylate, 6.25 g; n-butyl methacrylate, 32.5 g; 2-acetoacetoxy)ethyl methacrylate, 10 g; and acrylic acid, 5 g were charged into the reactor. The contents of the reactor were brought to its reflux temperature. A solution of 2,2'-azobis(2,4-dimethylvaleronitrile), 0.25 g in ethyl acetate, 5 g; was injected into the reactor. Feed 1 (n-butyl methacrylate, 130 g; 2-(acetoacetoxy)ethyl methacrylate, 40 g; and acrylic acid, 20 g) was then started and added to the reactor over 90 minutes. Feed 2 (n-butyl acrylate, 6.26 g) was started at the same time and added to the reactor over 15 minutes. Feed 3 (2,2'-azobis(2,4-dimethylvaleronitrile), 1.25 g in ethyl acetate, 25 g) was started at the same time as Feeds 1 and 2, and added to the reactor over 200 minutes. Feed 4 (2,2'-azobis(2,4-dimethylvaleronitrile), 1.0 g in ethyl acetate, 20 g) was started at the end of Feed 3 and added to the reactor over the next 200 minutes. The mixture was held at its reflux temperature for another 30 minutes to form a polymer solution and then allowed to cool to room temperature.

The resultant polymer has a Tg of about 10° C., weight average molecular weight of 187,000 and number average molecular weight of 55,000 and polydispersity of 3.4.

The polymer solution was coated onto a clean glass plate to a 6 mil wet film thickness and dried to form a clear glossy film. The water and oil resistance are expected to be very similar to the polymer solution of Example 1. The adhesion of the film was tested and the results are shown in Table I.

Example 4

A polymer solution of a polymer of methyl methacrylate (MMA), n-butyl methacrylate (BMA), 2-(acetoacetoxy) ethyl methacrylate (AAEMA) and acrylic acid (AA) (weight ratio 30/40/20/10) was prepared by charging the following constituents into a reactor equipped with a mechanical stirrer, thermometer and addition funnels.

Ethyl acetate, 250 g; butyl acetate, 123 g; methyl methacrylate, 30 g; n-butyl methacrylate, 40 g; 2-(acetoacetoxy)ethyl methacrylate, 20 g; and acrylic acid, 10 g; were charged to the reactor. The contents of the reactor were brought to its reflux temperature. A solution of 2,2'-azobis(2,4-dimethylvaleronitrile), 0.5 g in butyl acetate, 6.6 g; was injected to the reactor. Feed 1, (methyl methacrylate, 120 g; n-butyl methacrylate, 160 g; 2-(acetoacetoxy)-ethyl methacrylate, 80 g; and acrylic acid, 40 g) was then started and added to the reactor over 90 minutes. Feed 2, (2,2'-azobis(2,4-dimethylvaleronitrile), 2.5 g in butyl acetate, 32.75 g) was started at the same time as Feed 1, and added to the reactor over 200 minutes. Feed 3, (2,2'-azobis(2,4-dimethyl-valeronitrile), 2.0 g in butyl acetate, 26.2 g) was started at the end of Feed 2 and added to the reactor over the next 200 minutes. The mixture was held at its reflux temperature for another 30 minutes to form a polymer solution and then allowed to cool to room temperature.

The resultant polymer has a Tg of about 35° C., weight average molecular weight of 93,000 and a number average molecular weight of 41,000 and polydispersity of 2.3.

The polymer solution was coated onto a clean glass plate to a 6 mil wet film thickness and dried to form a clear glossy film. The water and oil resistance and adhesion are expected to be very similar to the polymer solution of Example 1.

Example 5

A polymer solution of a polymer of methyl methacrylate (MMA), n-butyl acrylate, (BA), n-butyl methacrylate (BMA), 2-(acetoacetoxy)ethyl methacrylate (AAEMA) and acrylic acid (AA) (weight ratio 10/5/55/20/10) was prepared by charging the following constituents into a reactor equipped with a mechanic stirrer, thermometer and addition funnels:

Ethyl acetate, 254 g; butyl acetate, 127 g; methyl methacrylate, 10 g; n-butyl acrylate, 5 g; n-butyl methacrylate, 55 g; 2-(acetoacetoxy)ethyl methacrylate, 20 g; and acrylic acid, 10 g; were charged into the reactor. The contents of the reactor were brought to its reflux temperature. A solution of 2,2'-azobis(2,4-dimethylvaleronitrile), 0.5 g in butyl acetate, 6.6 g; was injected into the pot. Feed 1 (methyl methacrylate, 40 g; n-butyl acrylate, 20 g; n-butyl methacrylate, 220 g; 2-(acetoacetoxy)ethyl methacrylate, 80 g; and acrylic acid, 40 g) was then started and added to the reactor over 90 minutes. Feed 2 (2,2'-azobis(2,4-dimethylvaleronitrile), 2.5 g in butyl acetate, 32.75 g) was started at the same time as Feed 1, and added to the reactor over 200 minutes. Feed 3 (2,2'-azobis(2,4-dimethylvaleronitrile), 2.0 g in butyl acetate, 26.2 g) was started at the end of Feed 2 and added to the reactor over the next 200 minutes. The mixture was held at its reflux temperature for another 30 minutes to form a polymer solution and then allowed to cool to room temperature.

The resultant polymer has a Tg of about 16° C., weight average molecular weight of 176,000 and number average molecular weight of 49,200 and polydispersity of 3.6.

The polymer solution was coated onto a clean glass plate to a 6 mil wet film thickness and dried to form a clear glossy film. The adhesion of the film was tested and the results are shown in Table I. Water and oil resistance are expected to be very similar to the polymer solution of Example 1.

Example 6

A polymer solution of a polymer of n-butyl methacrylate (BMA), 2-(acetoacetoxy)ethyl methacrylate (AAEMA) and methacrylic acid (MAA) (weight ratio 70/20/10) was prepared by charging the following constituents into a reactor equipped with a mechanic stirrer, thermometer and addition funnels:

Ethyl acetate, 129 g; was charged into the reactor and brought to its reflux temperature. Feed 1 (n-butyl methacrylate, 140 g; 2-(acetoacetoxy)ethyl methacrylate, 40 g; and methacrylic acid, 20 g) was then started and added to the reactor over 180 minutes. Feed 2 (2,2'-azobis(2,4-dimethylvaleronitrile), 2.2 g in ethyl acetate, 44 g) was started at the same time as Feed 1 and added to the reactor over 300 minutes. the mixture was held at its reflux temperature for another 30 minutes to form a polymer solution and then allowed to cool to room temperature.

The resultant polymer has a Tg of about 20° C., weight average molecular weight of 68,000 and number average molecular weight of 32,000 and polydispersity of 2.1.

The polymer solution was coated onto a clean glass plate to a 6 mil wet film thickness and dried to form a clear glossy film. The water and oil resistance and adhesion are expected to be very similar to the polymer solution of Example 1.

Comparative Examples (a)–(d) were prepared and the polymer solutions tested as in Example 1 for adhesion and the results are shown in Table I.

Example (a)

A polymer solution of a polymer of n-butyl methacrylate (BMA), and 2-(acetoacetoxy)ethyl methacrylate (AAEMA) (weight ratio 90/10) was prepared by charging the following constituents into a reactor equipped with a mechanic stirrer, thermometer and addition funnels:

Ethyl acetate, 140 g; n-butyl methacrylate, 36 g; and 2-(acetoacetoxy)ethyl methacrylate, 4 g; were charged into the reactor. The contents of the reactor were brought to its reflux temperature. A solution of 2,2'-azobis(2,4-dimethylvaleronitrile), 0.2 g in ethyl acetate, 6 g; was injected into the reactor. Feed 1 (n-butyl methacrylate, 144 g; and 2-(acetoacetoxy)ethyl methacrylate, 16 g) was then started and added to the reactor over 60 minutes. Feed 2 (2,2'-azobis(2,4-dimethylvaleronitrile), 1.0 g in ethyl acetate, 30 g) was started at the same time as Feed 1 and added to the reactor over 90 minutes. Feed 3 (2,2'-azobis(2,4azobis(2,4-dimethylvaleronitrile), 0.8 g in ethyl acetate, 24 g) was started at the end of Feed 2 and added to the rector over the next 150 minutes. The mixture was held at its reflux temperature for another 30 minutes to form a polymer solution and then allowed to cool to room temperature.

The resultant polymer has a Tg of about 16° C., weight average molecular weight of 72,900 and number average molecular weight of 26,800 and polydispersity of 2.7.

Example (b)

A polymer solution of a polymer of n-butyl methacrylate (BMA), and 2-(acetoacetoxy)ethyl methacrylate (AAEMA) (weight ratio 80/20) was prepared by charging the following constituents into a reactor equipped with a mechanic stirrer, thermometer and addition funnels:

Ethyl acetate, 129 g; was charged into the reactor and brought to its reflux temperature. Feed 1 (N-butyl methacrylate, 160 g; and 2-(acetoacetoxy)ethyl methacrylate, 40 g) was then started and added to the reactor over 180 minutes. Feed 2 (2,2'-azobis(2,4'-azobis(2,4-dimethylvaleronitrile), 2.2 g in ethyl acetate, 44 g) was started at the same time as Feed 1 and added to the reactor over 300 minutes. The mixture was held at its reflux temperature for another 30 minutes to form a polymer solution and then allowed to cool to room temperature.

The resultant polymer has a Tg of about 8° C., weight average molecular weight of 47,900 and number average molecular weight of 25,100 and polydispersity of 1.91.

Example (c)

A polymer solution of a polymer of n-butyl methacrylate (BMA), and acrylic acid (AA) (weight ratio 90/10) was prepared by charging the following constituents into a reactor equipped with a mechanical stirrer, thermometer and addition funnels:

Ethyl acetate, 140 g; n-butyl methacrylate, 36 g; and acrylic acid, 4 g; were charged into the reactor. The contents of the reactor were brought to its reflux temperature. A solution of 2,2'-azobis(2,4-dimethylvaleronitrile), 0.2 g in ethyl acetate, 6 g; was injected into the rector. Feed 1 (n-butyl methacrylate, 144 g; and 2-acrylic acid, 16 g) was then started and added over 60 minutes. Feed 2 (2,2'-azobis (2,4-dimethylvaleronitrile), 1.0 g in ethyl acetate, 30 g) was started at the same time as Feed 1 and added to the reactor over 90 minutes. Feed 3 (2,2'-azobis(2,4-dimethylvaleronitrile), 0.8 g in ethyl acetate, 24 g) was started at the end of Feed 2 and added to the reactor over the next 150 minutes. The mixture was held at its reflux temperature for another 30 minutes to form a polymer solution and then allowed to cool to room temperature.

The resultant polymer has a Tg of about 270° C., weight average molecular weight of 69,400 and number average molecular weight of 31,100 and polydispersity of 2.2.

Example (d)

A polymer solution of a polymer of n-butyl methacrylate (BMA), and methacrylic acid (MAA) (weight ratio 90/10) was prepared by charging to following constituents into a reactor equipped with a mechanical stirrer, thermometer and addition funnels:

Ethyl acetate, 140 g; n-but methacrylate, 36 g; and acrylic acid, 4 g; were charged into the reactor. The contents of the reactor were brought to its reflux temperature. A solution of 2,2'-azobis(2,4-dimethylvaleronitrile), 02 g in ethyl acetate, 6 g; was injected into the reactor. Feed 1 (n-butyl methacrylate, 144 g; and methacrylic acid, 16 g) was then started and added to the reactor over 60 minutes. Feed 2 (2,2'-azobis(2,4-dimethylvaleronitrile), 1.0 g in ethyl acetate, 30 g) was started at the same time as Feed 1 and added to the reactor over 90 minutes. Feed 3 ((2,2'-azobis (2,4-dimethylvaleronitrile) 0.8 g in ethyl acetate, 24 g) was started at the end of Feed 2 and added to the reactor over the next 150 minutes. The mixture was held at its reflux temperature for another 30 minutes to form a polymer solution and then allowed to cool to room temperature.

The resultant polymer has a Tg of about 33° C., weight average molecular weight of 63,400 and number average molecular weight of 29,200 and polydispersity of 2.2

The adhesion results as shown in Table I of Comparative Examples (a)–(d) clearly point out that the polymers which did not contain the combination of the acid constituent and the acetoacetoxy constituent had poor adhesion in comparison to Examples 1–6 in which the polymers had both of these constituents.

Example 7

A polymer solution of a polymer of 2-ethyl-hexyl methacrylate (EHMA), 2-(acetoacetoxy)ethyl methacrylate (AAEMA) and acrylic acid (AA) (weight ratio 70/20/10) was prepared by charging the following constituents into a reactor equipped with a mechanical stirrer, thermometer and addition funnels:

Ethyl acetate, 117 g; 2-ethyl-hexyl methacrylate, 35 g; 2-(acetoacetoxy)ethyl methacrylate, 10 g; and acrylic acid, 5 g; were charged into the reactor. The contents of the reactor were brought to reflux temperature. A solution of 2,2'-azobis (2,4-dimethylvaleronitrile), 0.25 g in ethyl acetate, 5 g; was injected into the reactor. Feed 1 (n-butyl methacrylate, 140 g; 2-(acetoacetoxy)ethyl methacrylate, 40 g; and acrylic acid, 20 g) was then started and added to the rector over 60 minutes. Feed 2 (2,2'-azobis(2,4-dimethylvaleronitrile), 1.25 g in ethyl acetate, 25 g) was started at the same time as Feed 1 and added to the reactor over 90 minutes. Feed 3 (3,3'-azobis(2,4-dimethylvaleronitrile) 1.0 g in ethyl acetate, 20 g) was started at the end of Feed 2 and added to the reactor over the next 340 minutes. The mixture was held at its reflux temperature for another 30 minutes to form a polymer solution and then allowed to cool to room temperature.

The resultant polymer has a Tg of about −6° C., weight average molecular weight of 106,000 and number average molecular weight of 41,000 and polydispersity of 2.6

The polymer solution was coated onto a clean glass plate to a 6 mil wet film thickness to form a very soft film. The adhesion of the polymer solution was tested as in Example 1 and the results are shown in Table I.

Example 8

A polymer solution of a polymer of 2-ethylhexyl methacrylate (EHMA), styrene (STY), iso-butyl methacrylate (iBMA), 2-(acetoacetoxy)ethyl methacrylate (AAEMA) and acrylic acid (AA) at weight ratio 35/30/5/20/10 respectively, was prepared by charging the following constituents into a reactor equipped with a mechanical stirrer, thermometer and addition funnels. 1-propanol, 163 g; EHMA, 14 g; STY, 12 g; i-BMA, 2 g; AAEMA, 8 g, and AA, 4 g; were charged into the reactor. The contents of the reactor were brought to reflux temperature. A solution of 2,2'-azobis(2,4-dimethylvaleronitrile) 0.8 g in 1-propanol, 4 g; was injected into the reactor. Feed 2, (2,2'-azobis(2,4-dimethylvaleronitrile), 6 g; in 1-propanol, 30 g) was started at the same time as Feed 1, and added to the reactor over 300 minutes. The mixture was held at reflux temperature for another 340 minutes to form a polymer solution and then allowed to cool to room temperature.

The resultant polymer has a Tg of about 25° C. and weight average molecular weight of about 50,000.

The polymer solution was coated onto a clean glass plate to a 6 mil wet film thickness and dried to form a clear glossy film. The water and oil resistance of the dried film and the adhesion of the film were tested. The results of these tests are shown in Table I.

Example 9

A polymer solution of a polymer of tris(trimethylsiloxy) silylpropyl methacrylate (TRIS), isobornyl methacrylate (i-BOMA), 2-(acetoacetoxy)ethyl methacrylate (AAEMA) and acrylic acid (AA) at weight ratio 35/35/20/10 respectively, was prepared by charging the following constituents into a reactor equipped with a mechanical stirrer, thermometer and addition funnels.

1-propanol, 163 g; TRIS, 14 g; i-BOMA, 14 g; AAEMA, 8 g, and AA, 4 g; were charged into the reactor. The contents of the reactor were brought to reflux temperature. A solution of 2,2-azobis(2,4-dimethylvaleronitrile), 0.8 g in 1-propanol, 4 g; was injected into the reactor. Feed 1 (TRIS, 56 g; i-BOMA, 56 g; AAEMA, 32 g, and AA, 16 g) was then started and added to the reactor over 100 minutes. Feed 2, (2,2'-azobis(2,4-dimethylvaleronitrile), 6 g; in 1-propanol, 30 g) was started at the same time as Feed 1, and added to the reactor over 300 minutes. The mixture was held at reflux temperature for another 30 minutes to form a polymer solution and then allowed to cool to room temperature.

The resultant polymer has a Tg of about 25° C. and weight average molecular weight of about 50,000.

The polymer solution was coated onto a clean glass plate to a 6 mil wet film thickness and dried to form a clear glossy film, the water and oil resistance of the dried film and the adhesion of the film were tested. The results of these tests are shown in Table I.

Example 10

A polymer solution of a polymer of styrene (STY), 2-(acetoacetoxy)ethyl methacrylate (AAEMA) and acrylic acid (AA) at weight ratio 70/20/10 respectively, was prepared by charging the following constituents into a reactor equipped with a mechanical stirrer, thermometer and addition funnels.

Ethyl acetate, 80 g; was charged into the reactor. The contents of the reactor were brought to reflux temperature. Feed 1 (STY, 140 g; AAEMA, 40 g, and AA, 20 g) was then started and added to the reactor over 180 minutes. Feed 2, (2,2'-azobis(2,4-dimethylvaleronitrile), 20 g; in ethyl acetate, 100 g) was started at the same time as Feed 1, and added to the reactor over 300 minutes. The mixture was held at reflux temperature for another 30 minutes to form a polymer solution and then allowed to cool to room temperature.

The resultant polymer as a weight average molecular weight of about 10,000.

The polymer solution was coated onto a clean glass plate to form a 6 mil film thickness and dried to form a clear glossy film. The water and oil resistance of the dried film and the adhesion of the film were tested. The results of these tests are shown in Table I.

Example 11

The polymer solution prepared in Example 1 was dried of solvents by placing the polymer solution in an oven at 70° C. for 12 hours. An aqueous polymer solution was prepared by adding 6 parts of 1-amino-methyl propanol, 125 parts of water and 125 parts of iso-propanol to 100 parts of dried polymer.

A film was cast on a clean dry glass plate and allowed to dry at room temperature, the resulting film was clear and glossy with good adhesion to the glass plate and was resistant to delamination by water. After baking in a 35° C. oven for 2 hours, resistance of the film to delamination by water was further enhanced.

Example 12

The polymer solution prepared in Example 1 was dried of solvents by placing the polymer solution in an oven at 70° C. for 12 hours. An aqueous solution was prepared by adding 6 parts of triethylamine, 125 parts of water and 125 parts of iso-propanol to 100 parts of dried polymer.

A film was cast on a clean dry glass plate and allowed to dry at room temperature, the resulting film was clear and glossy with good adhesion to the glass plate and resistance to delamination by water. After baking in a 35° C. oven for 2 hours, resistance of the film to delamination by water was further enhanced.

Example 13

The polymer solution prepared in Example 1 was dried of solvents by placing the polymer solution in an oven at 70° C. for 12 hours. An aqueous solution was prepared by adding 2.4 parts of ammonium hydroxide, 127 parts of water and 127 parts of iso-propanol to 100 parts of dried polymer.

A film was cast on a clean dry glass plate and allowed to dry at room temperature; the resulting film was clear and glossy and had good adhesion to the glass plate and resistance to delamination by water. After baking in a 35° C. oven for 2 hours, resistance of the film to delamination by water was further enhanced.

Example 14

An aqueous emulsion of a polymer of n-butyl methacrylate (BMA), 2-(acetoacetoxy)ethyl methacrylate (AAEMA) and acrylic acid (AA) (weight ratio 70/20/10) stabilized by sodium lauryl sulfate was prepared by the following procedure:

Water, 244 g; sodium lauryl sulfate, 1.0 g; were charged into a reactor equipped with a mechanical stirrer, thermocouple and addition funnels. The contents of this reactor were brought to reflux. Water, 18.6 g; n-butyl methacrylate, 14.0 g; 2-(acetoacetoxy)ethyl methacrylate, 4.0 g; and acrylic acid, 2.0 g; sodium lauryl sulfate, 0.10 g; sodium bisulfite, 0.05 g; ammonium persulfate, 0.66 g; were added to the reactor. Feed 1 (water, 85.5 g; n-butyl methacrylate, 126.0 g; 2-(acetoacetoxy)ethyl methacrylate, 36.0 g; and acrylic acid, 18.0 g; sodium lauryl sulfate, 0.9 g) was mixed using an Eppenbach homogenizer and was then added to the reactor over a period of 90 minutes. At the same time Feed 2 (water, 22.5 g; and sodium bisulfite, 0.44 g) was started and added to the reactor over a period of 90 minutes. Upon complete addition of Feeds 1 and 2, the contents in the reactor were kept at reflux for 30 minutes after which a mixture of water, 3.3 g; and ammonium persulfate, 0.15 g; was added to the reactor. The contents in the reactor were kept at reflux for an additional 30 minutes after which another mixture of water, 3.3 g; and ammonium persulfate, 0.15 g; was added, followed by yet another 30 minutes of reflux. The reactor was cooled to room temperature. The resultant emulsion was at 33% solids.

The resulting polymer has a Tg of about 16° C. and a weight average molecular weight of about 300,000 and a number average molecular weight of about 100,000.

A film was cast on a clean dry glass plate and allowed to dry at room temperature; the resulting film was clear and glossy with good adhesion to the glass plate and was tested for water resistance. The results are shown in Table II. After baking in a 35° C. oven for 2 hours, resistance of the film to delamination by water was further enhanced.

Example 15

This following reaction sequence describes the preparation of the ammonium salt of a polymer from Example 8.

A solution was prepared by addition of 4 parts of concentrated ammonium hydroxide solution, 25 parts of water to every 15 parts of polymer solution from Example 8.

The polymer solution was cast on a clean dry glass plate and allowed to dry at room temperature. The resultant film was clear, glossy and strong with good adhesion, resistance to delamination by water and oil and water resistance. The results are shown in Table II. After baking in a 35° C. oven for 2 hours, resistance of the film to attack by water was further enhanced.

Example 16

This following reaction sequence describes the preparation of the ammonium salt of a polymer from Example 9.

A solution was prepared by addition of 4 parts of concentrated ammonium hydroxide solution, 25 parts of water to every 15 parts of polymer solution from Example 9.

The polymer solution was cast on a clean dry glass plate and allowed to dry at room temperature. The resultant film was clear, glossy and strong with good adhesion and resistance to delamination by water and oil and water resistance. The results are shown in Table II.

TABLE II

| | Test Data | | |
|---|---|---|---|
| | Appearance (Note 1) | Water Resistance (Note 2) | Oil Resistance (Note 3) |
| Example 11 AMP salt of Example 1 | Clear Glossy Film | — | — |
| Example 12 TEA salt of Example 1 | Clear Glossy Film | — | — |
| Example 13 Ammonium salt of Example 1 | Clear Glossy Film | Fair | Fair |
| Example 14 Emulsion of Example 1 | Clear Glossy Film | Poor | — |

TABLE I

| | Test Data | | | |
|---|---|---|---|---|
| | Appearance (Note 1) | Water Resistance (Note 2) | Oil Resistance (Note 3) | Adhesion (Note 4) |
| Example 1 BMA/AAEMA/AA 70/20/10 | Clear Glossy Film | Good | Fair | 1 |
| Example 2 BMA/AAEMA/AA 80/10/10 | Clear Glossy Film | — | — | — |
| Example 3 BA/BMA/AAEMA/AA 5/65/20/10 | Clear Glossy Film | — | — | 1 |
| Example 4 MMA/BMA/AAEMA/AA 30/40/20/10 | Clear Glossy Film | — | — | — |
| Example 5 MMA/BA/BMA/AAEMA/AA 10/5/55/20/10 | Clear Glossy Film | — | — | 1 |
| Example 6 BMA/AAEMA/MAA 70/20/10 | Clear Glossy Film | — | — | — |
| Comparative Example (a) BMA/AAEMA 90/10 | Clear Glossy Film | — | — | 6 |
| Comparative Example (b) BMA/AAEMA 80/20 | Clear Glossy Film | — | — | 6 |
| Comparative Example (c) BMA/AA 90/10 | Clear Glossy Film | — | — | 5 |
| Comparative Example (d) BMA/MAA 90/10 | Glossy, Clear, Brittle Film | — | — | 10 |
| Example 7 EHMA/AAEMA/AA 70/20/10 | Very Soft Film | — | — | 1 |
| Example 8 EHMA/STY/iBMA/AAEMA/AA 35/30/5/20/10 | Clear Glossy Film | Excellent | Good | 1 |
| Example 9 TRIS/iBOMA/AAEMA/AA 35/35/20/10 | Clear Glossy Film | Excellent | Fair | 1 |
| Example 10 STY/AAEM/AA 70/20/10 | Clear Glossy Film | Excellent | Excellent | 1 |

TABLE II-continued

Test Data

|  | Appearance (Note 1) | Water Resistance (Note 2) | Oil Resistance (Note 3) |
|---|---|---|---|
| Example 15 Ammonium salt of Example 8 | Clear Glossy Film | Good | Fair |
| Example 16 Ammonium salt of Example 9 | Clear Glossy Film | Excellent | Fair |

Note 1: Appearance refers to gloss, clarity, and integrity of the dry film formed.
Note 2: Water Resistance refers to the degree of etching/deformation of the film as a result of contact with a drop of water for 5 minutes. Ratings are excellent, good, fair and poor.
Note 3: Oil resistance refers to the degree of etching/deformation of the film as a result of contact with a drop of commercial hand cream lotion (a mixture of water, cetyl esters, petroleum, isopropyl palmitate, triethanolamine, steryl alcohol, lanolin, methylparaben, propylparaben and other) for 5 minutes. Rating are excellent, good, fair and poor.
Note 4: Adhesion refers to the difficulty of removing the dried film from the glass plate when subjected to water temperatures of room temperature up to 70° C. The higher the temperature and/or the longer the time required to soak off the film, the stronger the adhesion of the film to the glass plate. An adhesion scale of 1–10 was used, with 1 being the best adhesion and 10 being the worst in adhesion and easiest to soak off the glass plate.

What is claimed is:

1. An acrylic polymer consisting essentially of polymerized monomers of about 55–80% by weight selected from the group consisting of butyl methacrylate, styrene, isobornyl methacrylate, a mixture of butyl methacrylate and butyl acrylate, a mixture of methyl methacrylate, butyl acrylate and butyl methacrylate, a mixture of ethyl methacrylate, styrene, isobornyl methacrylate, and a mixture of tris(trimethylsiloxy)silylpropyl methacrylate and isobornyl methacrylate and contains 5–40% by weight of aceto acetoxy ethyl methacrylate and 5–15% by weight of an ethylenically unsaturated acid and the acrylic polymer has a weight average molecular weight of about 10,000–3,000,000 determined by gel permeation chromatography using polymethyl methacrylate as the standard and a glass transition temperature of about 10° to 50° C.; wherein said acrylic polymer forms a hard adherent coating.

2. The acrylic polymer of claim 1 having a weight average molecular weight of about 200,000–3,000,000.

3. The acrylic polymer of claim 1 consisting essentially of polymerized monomers of butyl methacrylate, acetoacetoxy ethyl methacrylate and acrylic acid.

4. The acrylic polymer of claim 3 consisting essentially of polymerized monomers of about 70–80% by weight of butyl methacrylate, 10–20% by weight of acetoacetoxy ethyl methacrylate and 10% by weight of acrylic acid and has a glass transition temperature of about 15° C.

5. The acrylic polymer of claim 1 consisting essentially of polymerized monomers of styrene, acetoacetoxy ethyl methacrylate and acrylic acid.

6. The acrylic polymer of claim 1 consisting essentially of polymerized monomers of butyl acrylate, butyl methacrylate, acetoacetoxy ethyl methacrylate and acrylic acid.

7. The acrylic polymer of claim 6 consisting essentially of polymerized monomers of about 5% by weight of butyl acrylate, 65% by weight of butyl methacrylate, 20% by weight of acetoacetoxy ethyl methacrylate and 10% by weight of acrylic acid and has a glass transition temperature of about 10° C.

8. The acrylic polymer of claim 1 consisting essentially of polymerized monomers of methyl methacrylate, butyl methacrylate, acetoacetoxy ethyl methacrylate and acrylic acid.

9. The acrylic polymer of claim 8 consisting essentially of polymerized monomers of about 10–40% by weight of methyl methacrylate, 30–60% by weight of butyl methacrylate, 20% by weight of acetoacetoxy ethyl methacrylate and 10% by weight of acrylic acid and has a glass transition temperature of about 21°–43° C.

10. The acrylic polymer of claim 11 consisting essentially of polymerized monomers of methyl methacrylate, butyl acrylate, butyl methacrylate, acetoacetoxy ethyl methacrylate and acrylic acid.

11. The acrylic polymer of claim 10 consisting essentially of polymerized monomers of about 10% by weight of methyl methacrylate, 5% butyl acrylate, 55% by weight of butyl methacrylate, 20% by weight of acetoacetoxy ethyl methacrylate and 10% by weight of acrylic acid and has a glass transition temperature of about 16° C.

* * * * *